A. J. SAYERS.
AUTOMATIC HUTCH DEVICE FOR JIGS.
APPLICATION FILED JAN. 9, 1918.

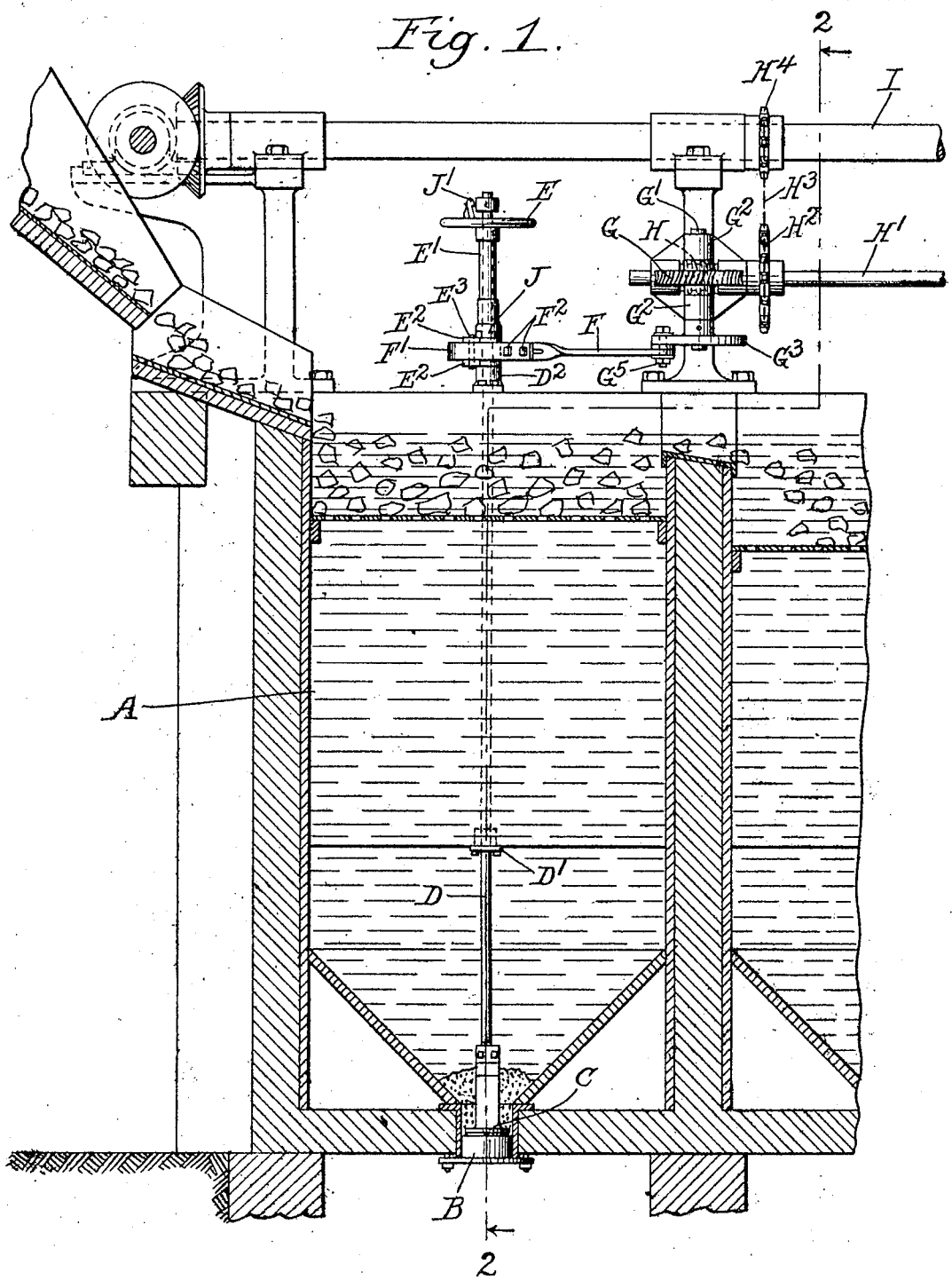

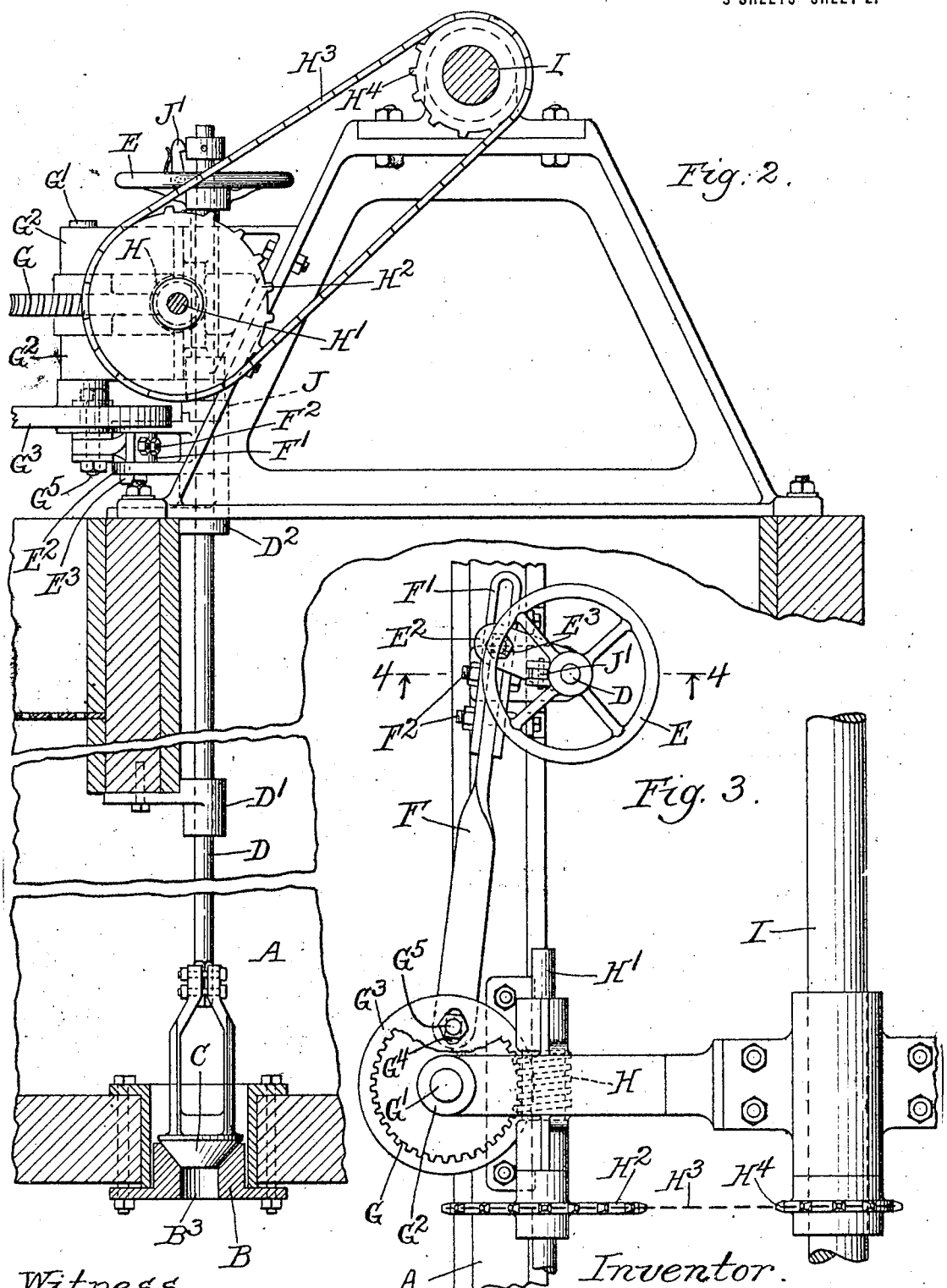

1,292,379.

Patented Jan. 21, 1919.
3 SHEETS—SHEET 3.

Witness.
Edward F. Wray.

Inventor.
Albert J. Sayers,
by Parker & Carter
Attorneys

UNITED STATES PATENT OFFICE.

ALBERT J. SAYERS, OF CHICAGO, ILLINOIS, ASSIGNOR TO LINK-BELT COMPANY, OF CHICAGO, ILLINOIS, A CORPORATION OF ILLINOIS.

AUTOMATIC HUTCH DEVICE FOR JIGS.

1,292,379.          Specification of Letters Patent.     Patented Jan. 21, 1919.

Application filed January 9, 1918. Serial No. 211,070.

*To all whom it may concern:*

Be it known that I, ALBERT J. SAYERS, a citizen of the United States, residing at Chicago, in the county of Cook and State of Illinois, have invented a certain new and useful Improvement in Automatic Hutch Devices for Jigs, of which the following is a specification.

My invention relates to automatic hutch valves for jigs and the like and has for one object to provide an automatic valve for the flushing of jigs. It is illustrated more or less diagrammatically in the accompanying drawings, wherein—

Figure 1 is a sectional view of a jig with my valve mechanism installed;

Fig. 2 is a section on an enlarged scale of the valve end mechanism;

Fig. 3 is a plan view of a valve operating mechanism;

Like parts are indicated by like characters in all the figures.

Figure 7:
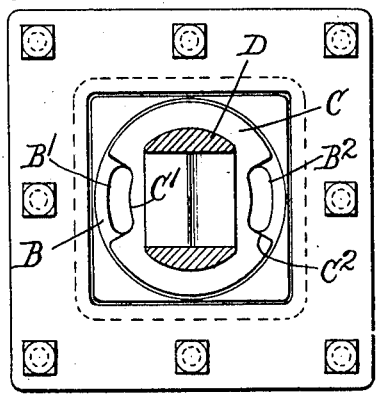
Fig. 7 is a plan view partly in section, of the valve.
Figure 5:
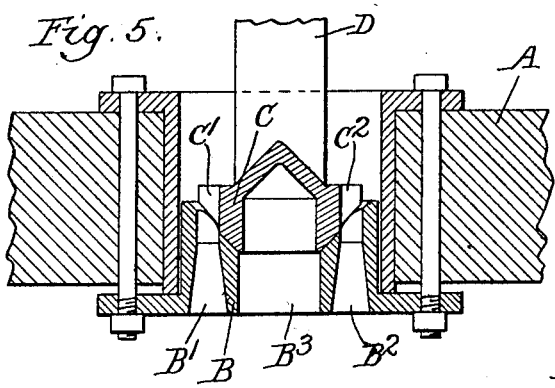
Fig. 5 is a section of the valve in the open position.
Figure 6:
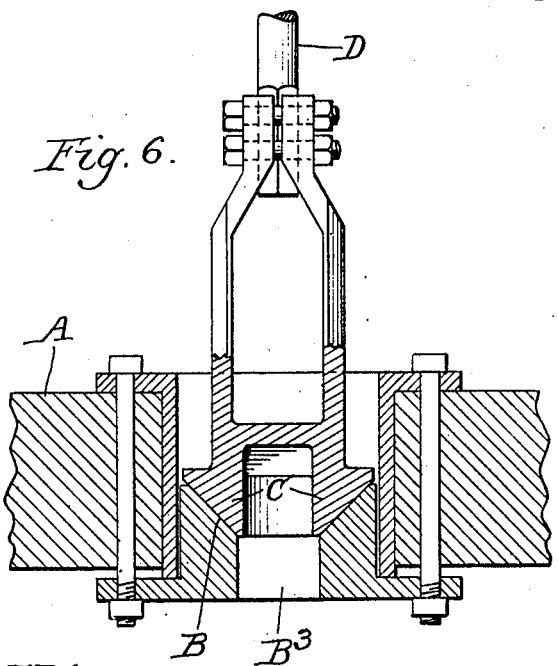
Fig. 6 is a section of the valve in the closed position.
Figure 4:
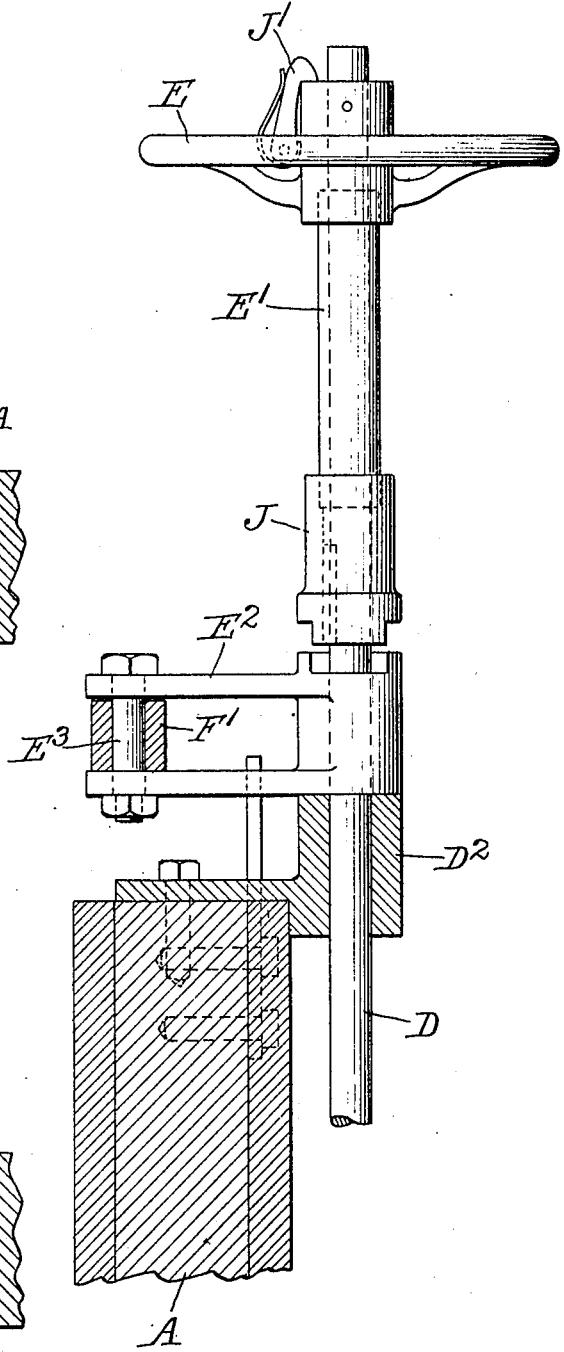
Fig. 4 is a detail section along the line 4—4 of Fig. 3 with parts in elevation.

A is a jig in the bottom of which is located the valve seat B in which is seated the rotary valve C carried on the shaft D. The valve seat B is ported at $B^1$ $B^2$ and has the central opening $B^3$ which is normally closed by the valve C but which when the valve is lifted is open. The valve C is a rotary valve having the two ports $C^1$ $C^2$ which come in register with the ports $B^1$ $B^2$ of the valve seat B twice during each revolution of the valve. The valve is carried by the operating shaft D which is supported in the bearings $D^1$ $D^2$ in the side of the jig.

The wheel E is mounted on the tubular shaft $E^1$ which is carried at the upper end of the shaft D and carries the bell crank $E^2$ provided with the pin $E^3$ in engagement with the loop $F^1$ on the connecting rod F. This loop may be adjusted for length by the bolts $F^2$ so as to vary the length of the operative stroke.

G is a worm gear on the shaft $G^1$ in mesh with the worm H. The shaft $G^1$ is mounted in the bearings $G^2$ and on its lower end has the crank disk $G^3$ with the adjustment slot $G^4$ in which is seated the bolt-connection $G^5$ by means of which the connecting shaft F is secured to the crank disk and by means of which its position may be adjusted and the length of its stroke varied. The worm H is carried by the shaft $H^1$ on which is mounted the driving sprocket $H^2$ which by means of the chain $H^3$ is driven from the driving sprocket $H^4$ on the main driving shaft I.

J is a jaw clutch feathered on the shaft D and is disengaged by lifting the hand wheel E and held out of engagement by the dogs $J^1$ by means of this clutch the valve moving mechanism may be disconnected so that the valve will remain stationary.

While it is evident that I have shown in my drawings an operative device, still many changes might be made both in size, shape and arrangement of parts without departing materially from the spirit of my invention and I wish, therefore, that my drawings be regarded as in a sense diagrammatic.

The use and operation of my invention are as follows:—

The hutch device is provided so that material may be discharged in controlled amounts from the bottom of the jig. This discharge takes place through the hutch discharge valve. This valve is controlled by a rotary movement. When rotated to one position the valve is closed, when rotated to an opposite position it is open and material can pass through.

The crank disk which is rotated by a gear and worm arrangement from the main operating jig shaft rotates forwardly in one direction, the connecting rod driven thereby reciprocates, and this reciprocating connecting rod rocks or oscillates the hutch valve shaft back and forth into the operative or open, and inoperative or closed position. By means of the slot in the crank disk the stroke of the connecting rod may be adjusted. This adjustment is ordinarily made for one jig and then is permanent, because normally the valve opens wide and closes shut.

In order to arrange for varying operating conditions, however, the time during which the hutch valve is open is controlled by adjusting the loop on the end of the connecting rod. In the position shown the hutch valve is wide open. It stays open until the connecting rod has been pulled back until the loop engages the end of the lever when the valve is shut. It stays shut until the end of the connecting rod has moved back to engage the lever when the valve is opened. By changing the length of this loop the time during which the valve is open may be nicely controlled.

In order that the hutch valve may be flushed out if desired, it is possible to lift up the whole valve assembly by merely taking hold of the controlling wheel at the upper end. The weights are not too great for a man to move them without any mechanism, and then the valve remains wide open and material may be flushed out by the water in the jig.

If, on the other hand, for some reason or other the material has gone out too much, and the hutch is discharging only water and not solid material, the clutch at the upper end of the hutch shaft may be disengaged and the lever will rotate without operating the hutch valve.

I claim:

1. A hutch valve for coal washing jigs and the like comprising a valve seat, a valve mounted for rotation on the seat, automatic driving means therefor, and means for adjusting the time during which the valve is open, said means comprising an adjustable lost motion connection.

2. A hutch valve for coal washing jigs and the like comprising a valve seat, a valve mounted for rotation on the seat, automatic driving means therefor, and means for adjusting the time during which the valve is open, said driving means comprising a lever mounted for rotation with the valve, a crank and means for driving it, and a rod between it and the lever.

3. A hutch valve for coal washing jigs and the like comprising a valve seat, a valve mounted for rotation on the seat, automatic driving means therefor, and means for adjusting the time during which the valve is open, said driving means comprising a lever mounted for rotation with the valve, a crank and means for driving it, a rod between it and the lever, and means for radially adjusting the pivot point of the connecting rod on the crank.

4. A hutch valve for coal washing jigs and the like comprising a valve seat, a valve mounted for rotation on the seat, automatic driving means therefor, and means for adjusting the time during which the valve is open, said driving means comprising a lever mounted for rotation with the valve, a crank and means for driving it, a rod between it and the lever and a lost motion connection between the connecting rod and the lever.

5. A hutch valve for coal washing jigs and the like comprising a valve seat, a valve mounted for rotation on the seat, automatic driving means therefor, and means for adjusting the time during which the valve is open, said driving means comprising a lever mounted for rotation with the valve, a crank and means for driving it, a rod between it and the lever, means for radially adjusting the pivot point of the connecting rod on the crank and a lost motion connection between the connecting rod and the lever.

6. A hutch valve for coal washing jigs and the like comprising a valve seat, a valve mounted for rotation on the seat, automatic driving means therefor, and means for adjusting the time during which the valve is open, said driving means comprising a lever mounted for rotation with the valve, a crank and means for driving it, a rod between it and the lever and a lost motion connection between the connecting rod and the lever, such connection being adjustable to vary at the will of the operator the time during which the valve is in the open position.

7. A hutch valve for coal washing jigs and the like comprising a valve seat, a valve mounted for rotation on the seat, automatic driving means therefor, and means for adjusting the time during which the valve is open, said driving means comprising a lever mounted for rotation with the valve, a crank and means for driving it, a rod between it and the lever, means for radially adjusting the pivot point of the connecting rod on the crank and a lost motion connection between the connecting rod and the lever, said connection being adjustable to vary at the will of the operator the time during which the valve is in the open position.

8. A hutch valve and means for operating it comprising a driving shaft, a crank driven thereby, a lever adapted to rotate with the valve connecting the rod driven by the crank and a lost motion connection between the connecting rod and the lever.

9. A hutch valve and means for operating it comprising a driving shaft, a crank driven thereby, a lever adapted to rotate with the valve, a connecting rod driven by the crank and a lost motion connection between the connecting rod and the lever, and means for adjusting the amount of lost motion between the lever and the connecting rod.

10. A hutch valve and means for operating it comprising a driving shaft, a crank driven thereby, a lever adapted to rotate with the valve, a connecting rod driven by the crank, a lost motion connection between the connecting rod and the lever and means for adjusting the amount of lost motion between the lever and the connecting rod, said means comprising a loop on the end of the connecting rod and a pin on the lever inclosed within said loop and means for adjusting the length of such loop in a direction parallel with the axis of the lever.

11. A hutch valve, a discharge port controlled thereby, means for automatically rotating said valve to open and close it, manual means for raising the valve off its seat to permit free discharge of material, and a discontinuous clutch between the valve and the valve rotating means.

12. A hutch valve, a discharge port controlled thereby, means for automatically rotating said valve to open and close it, manual means for raising the valve off its seat to permit free discharge of material, automatic means for maintaining the valve in raised position, and a discontinuous clutch between the valve and the valve rotating means.

In testimony whereof, I affix my signature in the presence of two witnesses this 19th day of December 1917.

ALBERT J. SAYERS.

Witnesses:
   JOHN H. D. PETERSEN,
   E. G. EWART.